US008602057B2

(12) United States Patent
Abura et al.

(10) Patent No.: US 8,602,057 B2
(45) Date of Patent: Dec. 10, 2013

(54) FLUID COUPLING

(75) Inventors: Yoshinori Abura, Osaka (JP); Katsuya Ishibe, Osaka (JP)

(73) Assignee: Nagahori Industry Co., Ltd., Osaka (JP)

( * ) Notice: Subject to any disclaimer, the term of this patent is extended or adjusted under 35 U.S.C. 154(b) by 501 days.

(21) Appl. No.: 12/894,853

(22) Filed: Sep. 30, 2010

(65) Prior Publication Data

US 2011/0266790 A1    Nov. 3, 2011

(30) Foreign Application Priority Data

Apr. 28, 2010   (JP) ................................. 2010-103866

(51) Int. Cl.
    *F16L 37/32*    (2006.01)
(52) U.S. Cl.
    USPC ............... 137/614.04; 137/614.03; 251/149.6
(58) Field of Classification Search
    USPC ............. 137/543.17, 614.03–614.05, 614.01, 137/614.02; 251/149.1, 149.3, 149.6, 251/149.9, 337
    See application file for complete search history.

(56) References Cited

U.S. PATENT DOCUMENTS

| 512,369 | A | * | 1/1894 | Garis et al. | ................ | 137/543.17 |
| 2,401,856 | A | * | 6/1946 | Brock | ................ | 137/543.17 |
| 3,196,897 | A | | 7/1965 | Hodson | | |
| 3,570,543 | A | * | 3/1971 | Ekman | ................ | 137/614.04 |
| 4,763,683 | A | | 8/1988 | Carmack | | |
| 5,016,671 | A | | 5/1991 | Barwise | | |
| 6,681,803 | B2 | | 1/2004 | Taneya et al. | | |
| 7,472,888 | B2 | * | 1/2009 | Nishio et al. | ................ | 251/337 |
| 7,722,010 | B2 | * | 5/2010 | Nishio et al. | ................ | 251/337 |
| 7,921,875 | B2 | * | 4/2011 | Moriiki et al. | ........... | 137/614.04 |
| 8,109,290 | B2 | * | 2/2012 | Sato et al. | ................ | 137/614.04 |
| 2005/0103387 | A1 | * | 5/2005 | Voege et al. | ............. | 137/614.04 |
| 2010/0001224 | A1 | * | 1/2010 | Edgar | ........................ | 251/337 |

FOREIGN PATENT DOCUMENTS

| DE | 32 28 140 | 2/1984 |
| JP | 2002-295770 | 10/2002 |
| JP | 2003-176893 | 6/2003 |
| KR | 20-1998-0040883 | 9/1998 |
| TW | 531622 | 5/2003 |

OTHER PUBLICATIONS

Korean Office Action (with English translation) issued Aug. 27, 2012 in corresponding Korean Patent Application No. 10-2010-0100155.
Extended European Search Report mailed Jul. 28, 2011 in corresponding European Patent Application No. 10 17 8675.
Taiwanese Office Action dated Oct. 29, 2012 in corresponding Taiwanese patent application No. 099131688 with English translation.

* cited by examiner

*Primary Examiner* — Craig Schneider
*Assistant Examiner* — Craig J Price
(74) *Attorney, Agent, or Firm* — Wenderoth, Lind & Ponack, LLP (57) ABSTRACT

A fluid coupling includes and houses, in a plug and a socket: valves; springs that bias the valves so as to bring the valves into pressure contact with valve seats; and spring holders which position and hold the springs. When the plug is inserted into the socket, the valves abut against each other and are retracted, and flow paths in the plug and the socket are connected to each other. Each of the valves includes: a largest diameter portion that abuts against an inner circumferential surface of the plug or the socket and positions the valve in an axial direction thereof; and inclined surfaces reduced in diameter from the largest diameter portion toward both sides in the axial direction.

7 Claims, 8 Drawing Sheets

FLUID COUPLING

BACKGROUND OF THE INVENTION

1. Field of the Invention

The present invention relates to a fluid coupling including a socket and a plug.

2. Description of the Related Art

Figure 13:
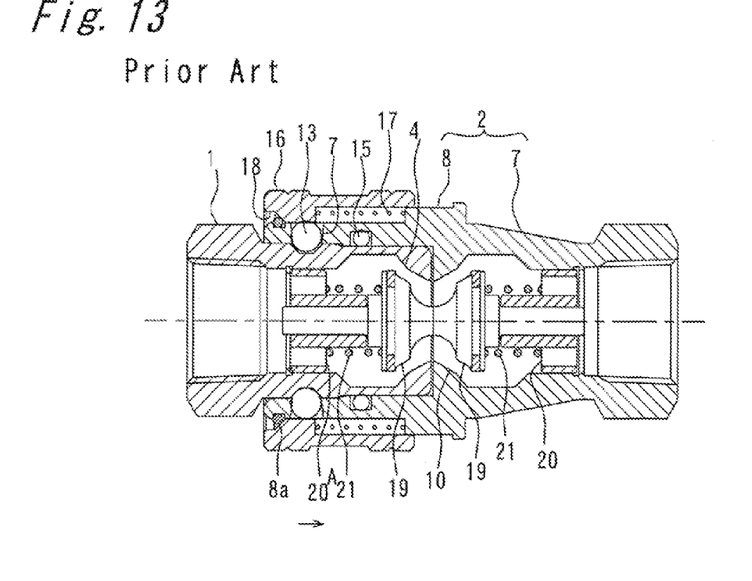
FIG. 13 is a cross-sectional view of a conventional fluid coupling, showing a state where the conventional fluid coupling is coupled.
Figure 14:
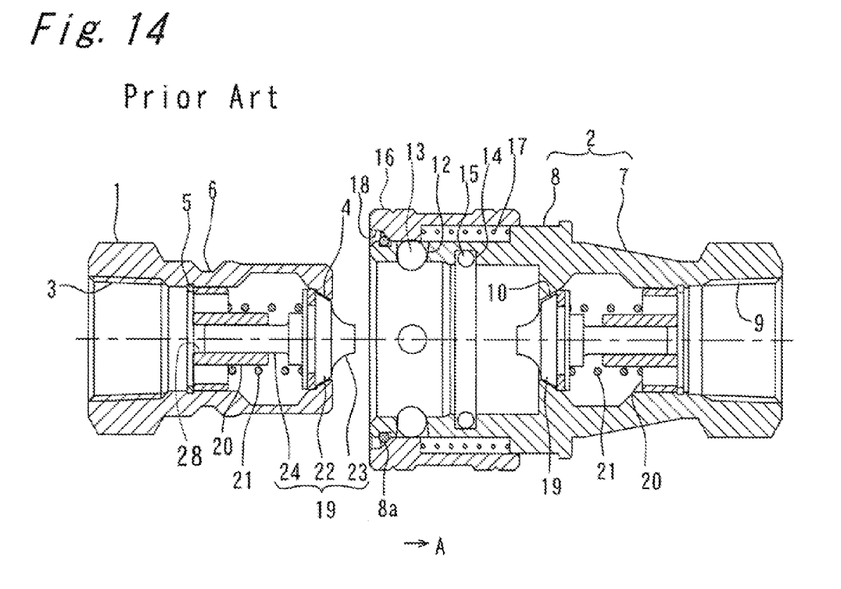
FIG. 14 is a cross-sectional view of the conventional fluid coupling in FIG. 13, showing a state where the conventional fluid coupling is separated.

FIG. 13 shows a state where a plug 1 and a socket 2 in a conventional fluid coupling as described in Japanese Unexamined Patent Publication No. 2002-295770 are assembled with each other, and FIG. 14 shows a state where the plug 1 and the socket 2 are separated from each other.

As shown in FIG. 13, the plug 1 and the socket 2 have shapes of cylinders in which flow paths are formed on inner surfaces. On the inner surface of one end of the plug 1 is formed a female screw 3, to which one of pipes is connected by screw joint. A screw ball engaging outer circumferential groove 6 is formed on a center of an outer circumference of the plug 1.

The socket 2 includes a main body portion 7 on a right side in FIG. 13 and a plug insertion portion 8 on a left side therein. Symmetrically to the plug 1, on the inner surface of one end of the main body portion 7 is formed a female screw 9, to which the other pipe is connected by the screw joint.

In the vicinity of an opening end (left end in FIG. 13) of the plug insertion portion 8 of the socket 2, a stopper 8a is formed on an outer surface thereof, and steel balls 13 are housed in a plurality of holes 12. On an inner circumferential groove 14 formed on a center of an inner surface of the plug insertion portion 8, an O-ring 15 is mounted. On an outer circumferential surface of the plug insertion portion 8, a sleeve 16 is fitted, and is biased toward the opening end (left end in FIG. 13) by a spring 17.

As shown in FIG. 14, a valve 19 housed in an inside of the plug 1 includes a valve main body portion 22 that abuts against a valve seat 4 of the plug 1, a protruding portion 23 that protrudes outward of an opening end of the plug 1 from the valve main body portion 22, and a valve guide 24 that protrudes inward of the plug 1 from the valve main body portion 22.

In a cylindrical portion 28 that forms a part of a valve holder 20, the valve guide 24 of the valve 19 is inserted so that the valve 19 is supported slidably in an axial direction thereof.

A spring 21 biases the valve main body portion 22 of the valve 19 so that the valve main body portion 22 abuts against the valve seat 4.

In order to perform a coupling action to the conventional fluid coupling configured as described above, first, the sleeve 16 of the socket 2 is moved in a direction of an arrow A as shown in FIG. 14. When the plug 1 is inserted into the plug insertion portion 8 of the socket 2 in this state, the steel balls 13 of the socket 2 are retreated to the inner circumferential groove 18 of the sleeve 16, and accordingly, the plug 1 can be inserted into the plug insertion portion 8 of the socket 2. When the plug 1 is inserted to a deep portion of the plug insertion portion 8 of the socket 2, the protruding portion 23 of the valve 19 of the plug 1 presses the protruding portion 23 of the valve 19 of the socket 2. In such a way, as shown in FIG. 13, the valve 19 of the plug 1 and the valve 19 of the socket 2 are retreated by pressing each other, and it becomes possible to move a fluid therebetween. When the sleeve 16 is returned in a direction reverse to the direction of the arrow A, the steel balls 13 leave the inner circumferential groove 18 and are pressed by the inner circumferential surface of the sleeve 16 to protrude from an inner surface of the socket 2. Then, the steel balls 13 are engaged and locked with the outer circumferential surface of the plug 1. In such a way, the plug 1 is inhibited from leaving the plug insertion portion 8 of the socket 2.

In order to release the coupling between the plug 1 and the socket 2, the sleeve 16 is moved in the direction of the arrow A from the state shown in FIG. 13, and the plug 1 is pulled in a leaving direction. Then, the steel balls 13 are retreated to the inner circumferential groove of the sleeve 16, whereby the plug 1 can be pulled out. When the plug 1 leaves the socket 2, the valves 19 of the plug 1 and the socket 2 individually move forward by being biased by the springs 21, and are brought into pressure contact with the valve seats 4 and 10. Then, the opening ends of the plug 1 and the socket 2 are closed so as to seal the fluid, and sealing by the O-ring 15 between the plug 1 and the socket 2 is also released. As a result, the plug 1 and the socket 2 can be detached from each other without causing fluid leakage.

Figure 15:
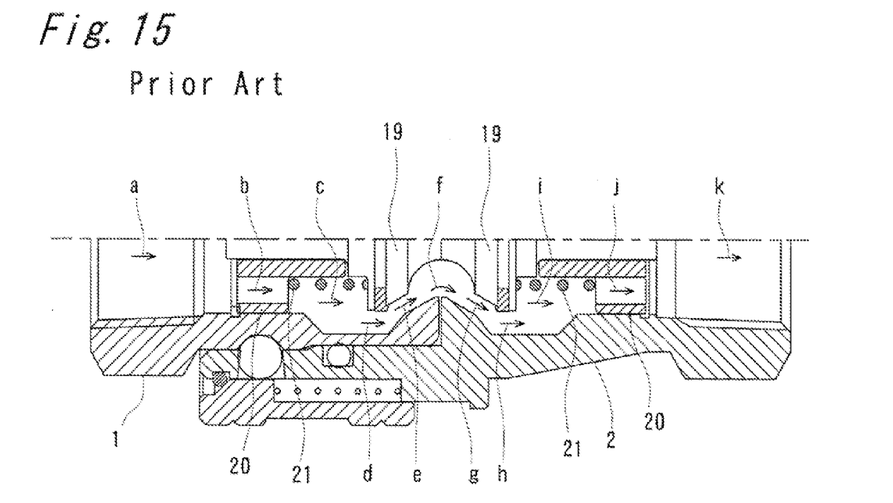
FIG. 15 is a cross-sectional view showing flow paths of the conventional fluid coupling in FIG. 13.

In a fluid coupling of a pipe system, it is ideal in terms of ensuring a flow rate without causing a pressure loss that a diameter of a flow path thereof is not changed in order to have a fixed cross-sectional area, and a flowing direction of the fluid is constant. However, in the conventional fluid coupling, as shown in FIG. 15, the fluid that has flown in from an inlet path a of the plug 1 passes through the valve holder 20 (flow path b) of the plug 1, the spring 21 (flow path c), an outer diameter portion (flow path d) of the valve 19, a narrow portion (flow path e) of the valve 19, and a boundary portion (flow path f) between the plug 1 and the socket 2. Then, the fluid further passes through a narrow portion (flow path g) of the valve 19 of the socket 2, an outer diameter portion (flow path h) of the valve 19, the spring 21 (flow path i), and the valve holder 20 (flow path j), and then flows out from an outlet path k. The fluid coupling has such a complicated route, and accordingly, the cross-sectional area and the flowing direction are changed, resulting in the pressure loss.

Since the fluid coupling has such complicated flow paths, it is necessary to allow some pressure loss. However, the market desires a fluid coupling with a low pressure loss, in which a flow path resistance of each portion is small and a larger flow rate can be ensured.

Figure 16:
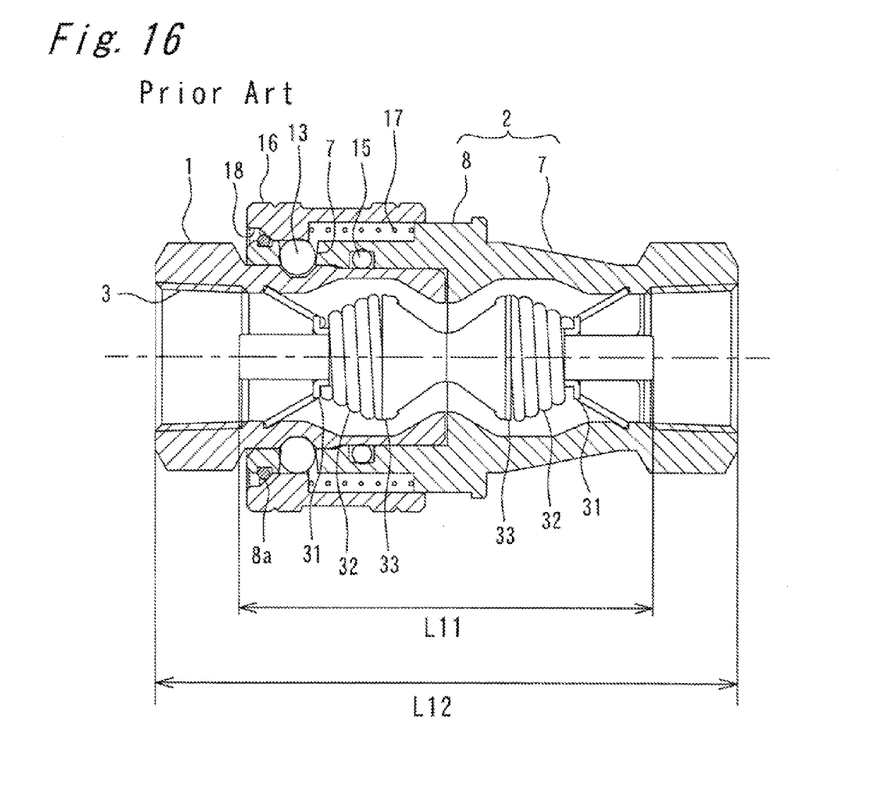
FIG. 16 is a cross-sectional view of another conventional fluid coupling, showing a state where the conventional fluid coupling is coupled.

In view of the above, a fluid coupling shown in FIG. 16 is proposed. In this fluid coupling, there is provided, between each valve 33 and each valve holder 31, a conic coil spring 32 that has an outer diameter gradually changed according to a conic shape along a line connecting an outer diameter portion of the valve 33 and an outer diameter portion of the valve holder 31 when the valve 33 of the plug 1 and the valve 33 of the socket 2 abut against each other and each spring 32 is compressed.

With such a configuration as described above, reduction and increase of the flow, which have occurred heretofore due to differences in height among the flow paths, are eliminated, and there is no collision of the fluid or occurrence of a swirl, and thereby the pressure loss can be reduced. Moreover, an effective opening area of the fluid coupling is large, and flow path resistances of the plug and the socket are reduced to a great extent, and thereby the pressure loss occurring when the fluid is flown at the same flow rate can be reduced.

SUMMARY OF THE INVENTION

It is an object of the present invention to provide a fluid coupling capable of simplifying a structure thereof while achieving further reduction of the pressure loss.

The present invention has been made in consideration of the conventional problems, and provides a fluid coupling having a plug and a socket. The plug and the socket are coupled to each other so as to seal a fluid therebetween, and each of the plug and the socket includes:

a valve;

a spring that biases the valve so as to bring the valve into pressure contact with a valve seat formed on an inner circumferential surface of the plug or the socket; and a spring holder that positions and holds the spring, wherein each of the plug and the socket houses the valve, the spring, and the spring holder, when the plug is inserted into the socket, the valve of the plug and the valve of the socket abut against each other are retreated against biasing forces of the springs, and flow paths in the plug and the socket are thereby connected to each other, and each of the valves has:

a largest diameter portion that abuts against the inner circumferential surface of the plug or the socket and positions the valve in an axial direction thereof; and inclined surfaces reduced in diameter into a conic shape from the largest diameter portion toward both sides in the axial direction.

In the above-described configuration, a valve guide as provided heretofore is not provided. Accordingly, overall lengths of the valves are shortened, and a distance between the spring holder of the socket and the spring holder of the plug, that is, a resistance occurrence section is shortened, whereby the resistance occurring in the flow path can be reduced. Moreover, overall lengths of the plug and the socket can be shortened, and accordingly, a space of an installation place for the fluid coupling is reduced, and a material for forming the fluid coupling is reduced, whereby resources can be saved.

Preferably, one end of each of the springs is supported by the spring holder, and the other end of each of the springs is housed in a spring mounting hole provided in the valve.

In such a way, each of the springs can bias the valve toward the valve seat.

Preferably, each of the springs provided between the valve and the spring holder is housed in an inside of the valve when the valve of the plug and the valve of the socket abut against each other and the spring is compressed.

With the above-described configuration, the resistances that have occurred heretofore in the springs can be eliminated. Moreover, in the state where the plug is attached to the socket, the two valves form a continuous flow path without forming a gap therebetween between the spring holder of the plug and the spring holder of the socket, whereby a resistance of the flow path can be reduced, and the valves can be stably positioned in the axial direction.

Preferably, each of the springs has an outer diameter sufficient for contacting an inside of the spring mounting hole.

In such a way, even if the springs are expanded or contracted, the valves can be held on a center axis of the fluid coupling.

Preferably, among end portions of the valve of the plug and the valve of the socket which are opposite to each other, one of the end portions is formed with a recessed portion, and another one of the end portions is formed with a protruding portion.

Hence, when the plug is attached to the socket, the valve of the plug and the valve of the socket are surely engaged with each other, whereby an unnecessary resistance increase at the time of fluid passage, which is caused by an occurrence of center offsets in the valves, can be prevented.

Preferably, the recessed portion is formed on the end portion of the valve of the plug.

In such a way, in a state where the plug and the socket are separated from each other, the socket is often kept mounted on a pipe. However, as the plug is connected to a hose or the like, an abutment portion located on a tip end of the valve of the plug sometimes collides with another member, and in particular, if the tip end of the valve has a protruding shape, the tip end is prone to be scratched. If the tip end of the valve is scratched, fitting between the valves becomes unstable upon attaching the plug to the socket, and a difference in height, a gap, or the like may occur therebetween, thereby causing a resistance to the flow of the fluid. Hence, the plug-side abutment portion is formed into the recessed portion, whereby the tip end of the valve can be prevented from being scratched owing to such collision with another member, the fitting between the valves can be surely made to prevent the resistance to the flow of the fluid.

Preferably, each of the spring holders includes:

a base portion engaged with a step portion provided on an inner circumferential surface of the plug or the socket;

raised walls raised from both edges of the base portion; and protrusions which protrude from the raised walls toward the valve concentrically with a center axis of the socket or the plug, and support the spring.

With the above-described configuration, a length of each of the spring holders in the axial direction is shortened. Accordingly, the resistance occurrence section between the spring holder of the socket and the spring holder of the plug is further shortened, whereby the resistance occurring in the flow path can be reduced and the overall lengths of the plug and the socket can be shortened. Moreover, the configurations of the valves and the spring holders are simplified, whereby manufacturing cost of the fluid coupling can be reduced.

Preferably, an opening is provided in the base portion of each of the spring holders.

In such a way, a surface area of each of the spring holders in a direction of the flow path is reduced, and the pressure loss by each of the spring holders is reduced, whereby a flow rate of the fluid in the flow path can be increased.

Preferably, end portions of the raised walls of each of the spring holders abut against the inner circumferential surface of the plug or the socket.

In such a way, the spring holders are positioned on the inner circumferential surfaces of the plug and the socket, whereby centers of the spring holders and centers of the plug and the socket can be prevented from being shifted from each other.

Preferably, edge portions of each of the spring holders are curved so as to abut against the inner circumferential surface of the socket or the plug.

Hence, the centers of the spring holders and the centers of the plug and the socket can be further prevented from being shifted from each other.

Preferably, the raised walls of the spring holder installed on an upstream side in the flow path in the inside of the plug are raised from the base portion toward a downstream direction in the flow path.

In such a way, as compared with a case where the raised walls are raised toward the upstream side, the resistance caused by the spring holder on an inlet side of the flow path, where the pressure loss is large, can be reduced, and the pressure resistance in the flow path can be stabilized, and a resistance balance can be ensured.

In the present invention, each of the valves has the largest diameter portion and the inclined surfaces reduced in diameter from the largest diameter portion toward both sides in the axial direction. Accordingly, the valve guides as provided heretofore are not necessary. Hence, the overall lengths of the valves are shortened, and the resistance occurrence section between the spring holder of the socket and the spring holder of the plug is shortened, whereby the resistance occurring in the flow path can be reduced. Moreover, the overall lengths of the plug and the socket can be shortened, and accordingly, the space of the installation place for the fluid coupling is reduced, and the material for forming the fluid coupling is reduced, whereby the resources can be saved.

Each of the spring holders includes the base portion engaged with the step portion provided on the inner circumferential surface of the plug or the socket, the raised walls raised from both edges of the base portion, and the protrusions which protrude from the raised walls toward the valve concentrically with the center axis of the socket or the plug, and support the spring. Hence, the length of each of the spring holders in the axial direction is shortened. Accordingly, the resistance occurrence section between the spring holder of the socket and the spring holder of the plug is further shortened, whereby the resistance occurring in the flow path can be reduced, and in addition, the overall lengths of the plug and the socket can be shortened.

DETAILED DESCRIPTION OF THE PREFERRED EMBODIMENT

A description is made below in detail of an embodiment of the present invention with reference to the accompanying drawings.

Figure 1:
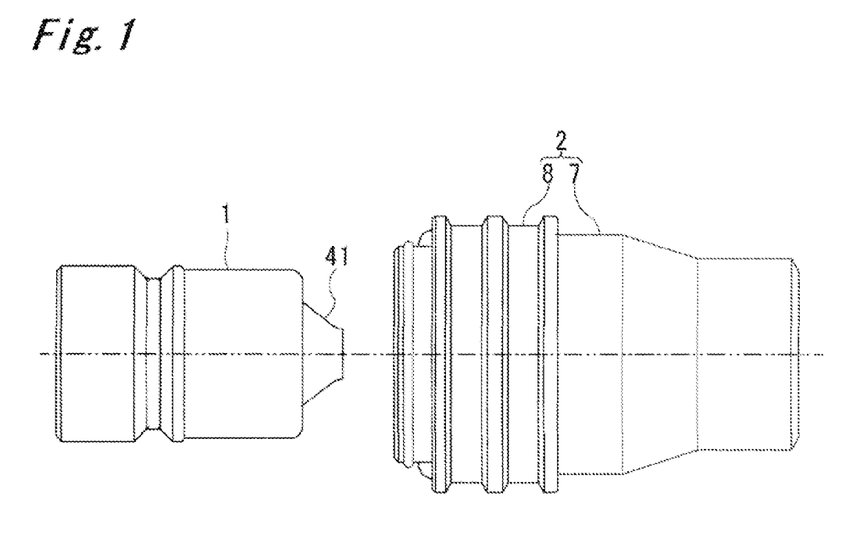
FIG. 1 is a side view of a fluid coupling according to an embodiment of the present invention, showing a state where the fluid coupling is separated.
Figure 2:
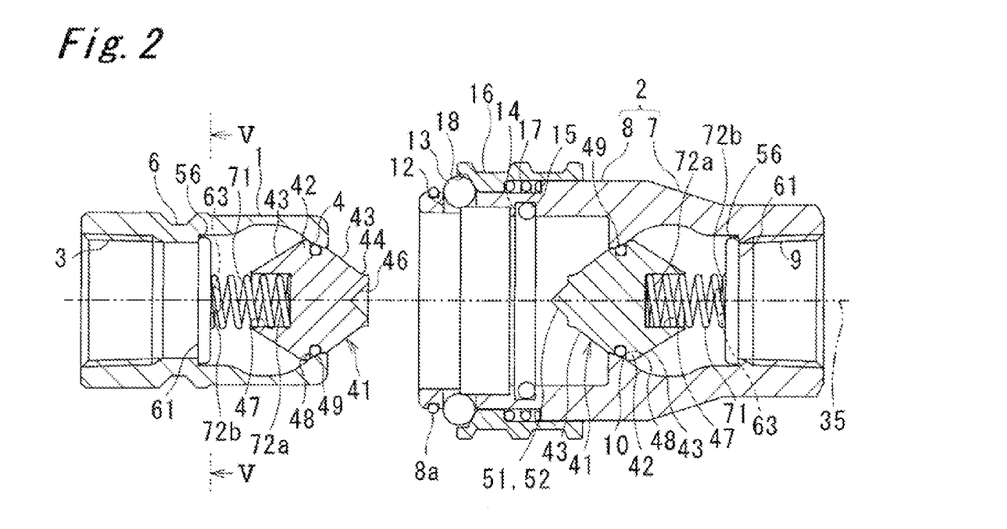
FIG. 2 is a cross-sectional view of the fluid coupling according to the embodiment of the present invention in FIG. 1, showing a state where the fluid coupling is separated.
Figure 3:
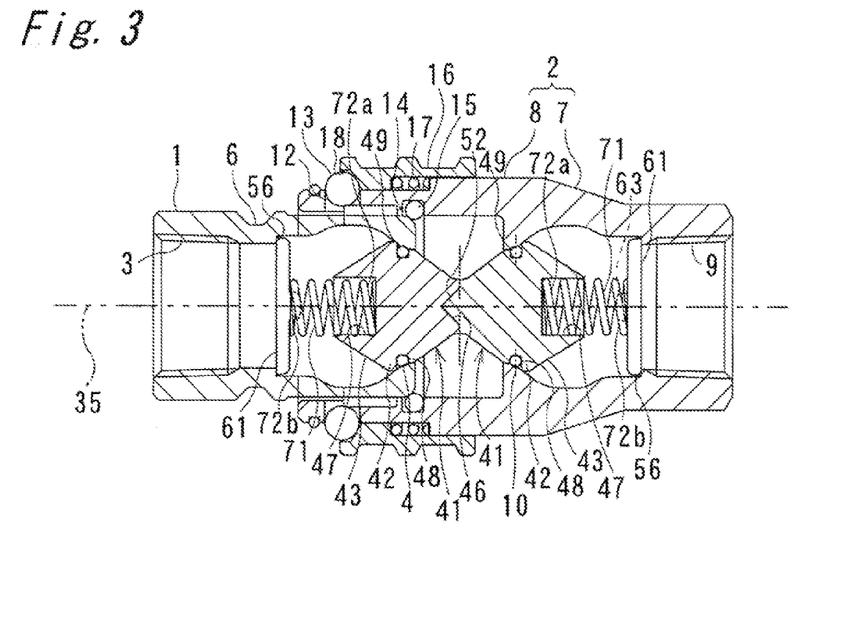
FIG. 3 is a cross-sectional view of the fluid coupling according to the embodiment of the present invention in FIG. 2, showing a state where the fluid coupling is subjected to a coupling action.
Figure 4:
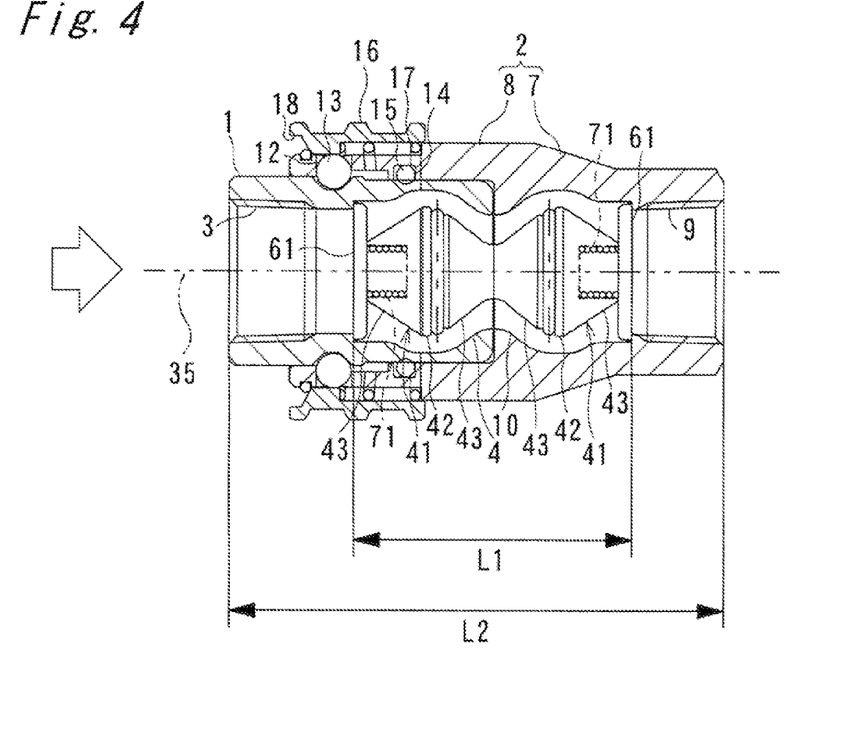
FIG. 4 is a cross-sectional view of the fluid coupling according to the embodiment of the present invention in FIG. 2, showing a state where the fluid coupling is coupled.

FIG. 1 is a side view of a plug 1 and socket 2 of a fluid coupling according to the embodiment of the present invention. FIG. 2 is a cross-sectional view showing a state where the plug 1 and the socket 2 are separated from each other. FIG. 3 is a cross-sectional view showing a state where the plug 1 and the socket 2 are being assembled with each other. FIG. 4 is a cross-sectional view showing a state where the plug 1 and the socket are assembled with each other.

In FIG. 1 to FIG. 4, the plug 1 and the socket 2 are substantially the same as the plug and socket of the conventional fluid coupling shown in FIGS. 13 and 14 except a part of the shapes of the flow paths, and the same reference symbols are assigned to corresponding portions thereof and a description thereof will not be provided. Accordingly, a description is made below of a valve 41, a spring holder 61, and a spring 71 in an inside of the plug 1. A valve, a spring holder, and a spring in an inside of the socket 2 have the same shapes as those in the plug 1, and are arranged symmetrically therewith. Therefore, the same reference symbols are assigned to the valve, the spring holder, and the spring in the socket 2 and a description thereof will not be provided. Moreover, it is assumed that a fluid flows through the insides of the plug 1 and the socket 2 in a direction of an arrow in FIG. 4, though the fluid may flow in a reverse direction.

Figure 6:
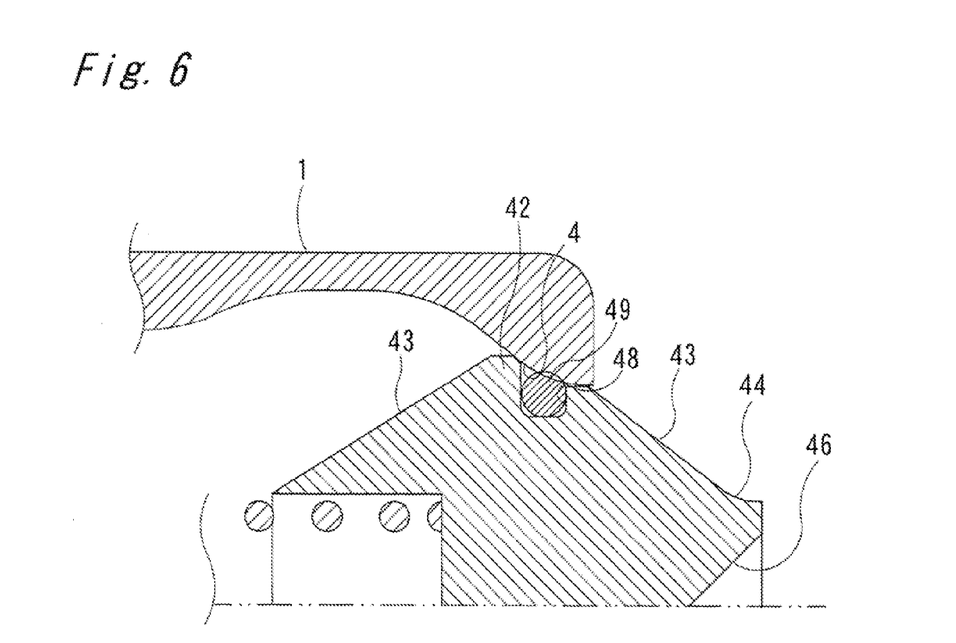
FIG. 6 is a partially enlarged cross-sectional view showing a state where a valve abuts against a valve seat of a plug.

The valve 41 includes: a largest diameter portion 42 on a center thereof, expanded in diameter toward an inner circumferential surface of the plug 1 or the socket 2 and a conic inclined surface 43 reduced in diameter from the largest diameter portion 42 toward both sides in an axial direction thereof. As shown in FIG. 6, the largest diameter portion 42 is allowed to abut against the inner circumferential surface of the plug 1 or the socket 2, and prevents the valve 41 from getting out of the plug 1 or the socket 2 by a spring 71 to be described later or an inner pressure. Moreover, an outer circumferential groove 48 is provided in the vicinity of the largest diameter portion 42 on the inclined surface 43, and a valve packing 49 is mounted in the outer circumferential groove 48. The valve packing 49 abuts against a valve seat 4 of the plug 1, and thereby seals the inside of the plug 1 and prevents fluid leakage therefrom.

On one end portion of the valve 41 housed in the plug 1, that is, on a plug-side abutment portion 44 that abuts against the valve 41 of the socket 2, a recessed portion 46 is formed concentrically with a center axis 35 of the fluid coupling. On the other end portion of the valve 41, a spring mounting hole 47 is formed concentrically with the center axis 35.

On one end portion of the inclined surface 43 that forms the valve 41 housed in the socket 2, that is, on a socket-side abutment portion 51 that abuts against the plug-side abutment portion 44, a protruding portion 52 with which the recessed portion 46 of the plug-side abutment portion 44 is engageable is formed concentrically with the center axis 35.

Figure 5:
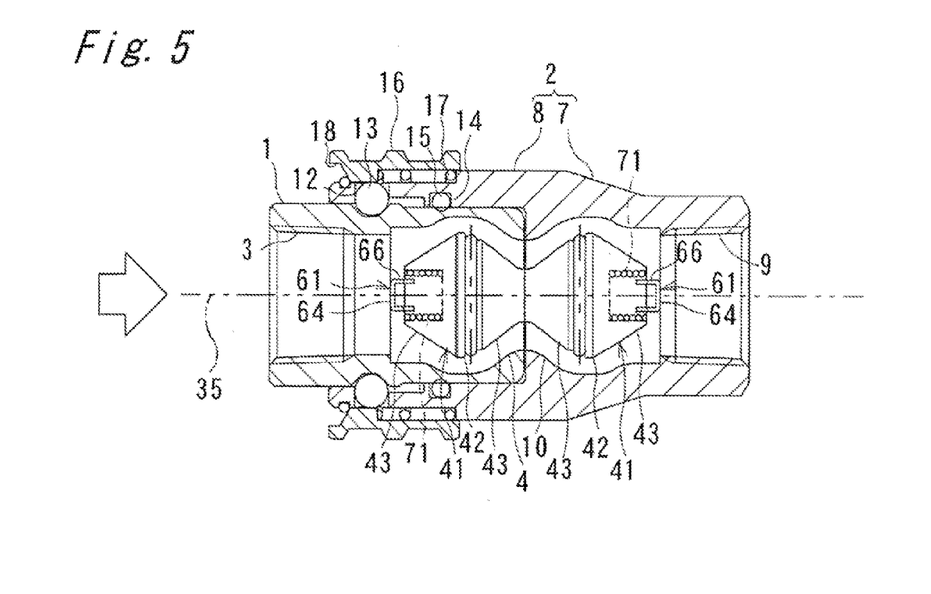
FIG. 5 is a cross-sectional view of the fluid coupling in FIG. 4, which is viewed from a different angle.
Figure 7:
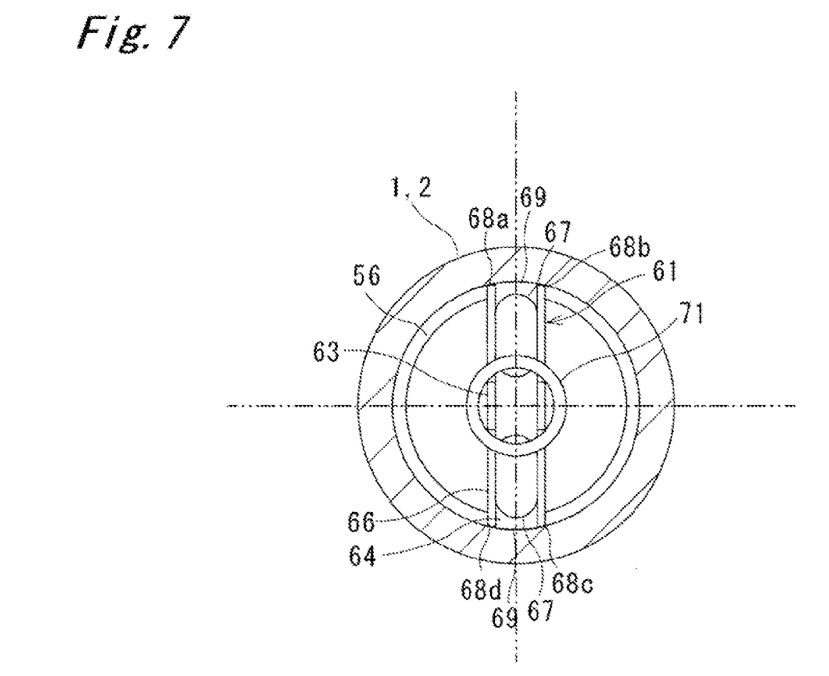
FIG. 7 is a cross-sectional view taken along a line V-V, showing a spring holder provided in the fluid coupling in FIG. 2.
Figure 8:
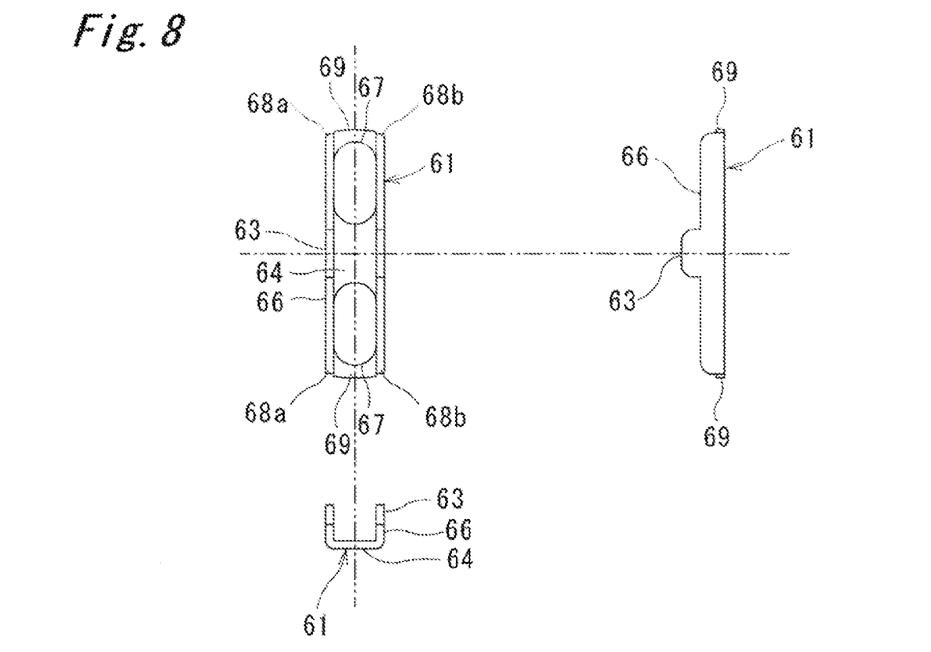
FIG. 8 includes a plan view, a front view, and a side view of the spring holder in FIG. 7.

As shown in FIG. 7 and FIG. 8, the spring holder 61 includes: a base portion 64 of a substantially rectangular shape, a pair of raised walls 66 formed by being raised from both edges of the base portion 64, and protrusions 63 which protrude from the raised walls 66. In the base portion 64, long openings 67 which extend outward in a radius direction when viewed from the plain, are formed. The base portion 64 is supported on a step portion 56 of the plug 1 so as to be perpendicular to a flow path of the plug 1. Moreover, the raised walls 66 are oriented toward a downstream direction of the flow path (refer to FIG. 5). The protrusions 63 are fitted and inserted into an inner circumferential surface of a terminal end portion 72b of the spring 71, and hold the spring 71 around the center axis 35.

Figure 9:
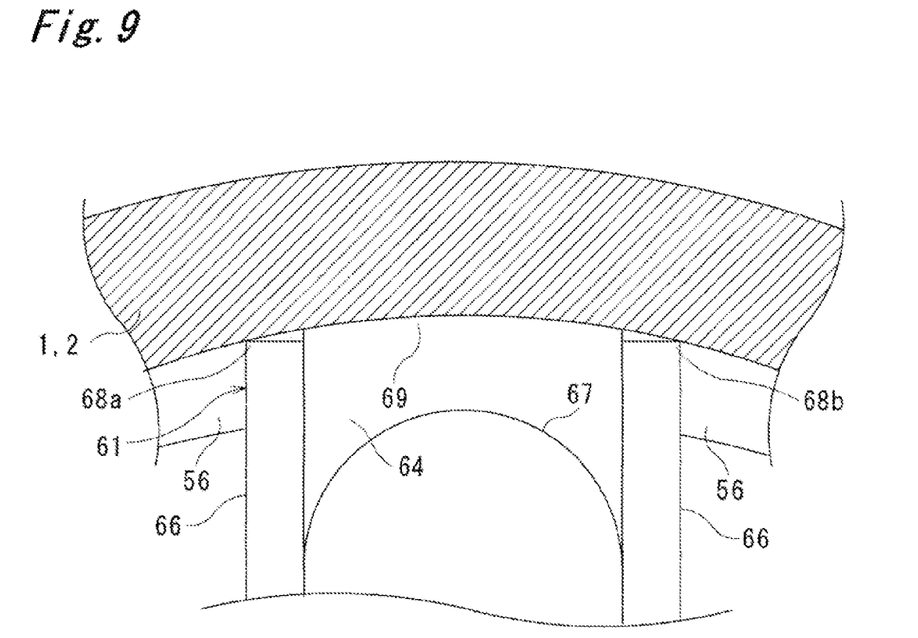
FIG. 9 is a partially enlarged plan view of the spring holder in FIG. 7.

Referring to FIG. 9, in the spring holder 61 mounted on the plug 1, end portions 68a and 68b of the raised walls 66 abut against the inner circumferential surface of the plug 1. Moreover, edge portions 69 of the base portion 64 are curved so as to abut against the inner circumferential surface of the plug 1.

The spring 71 is a publicly known elastic member, and is arranged in the axial direction between the valve 41 and the spring holder 61. As shown in FIG. 2, one terminal end portion 72a of the spring 71 is fitted and inserted into the spring mounting hole 47 of the valve 41, and the other terminal end portion 72b is inserted to outsides of the protrusions 63 formed on the spring holder 61.

Figure 10:
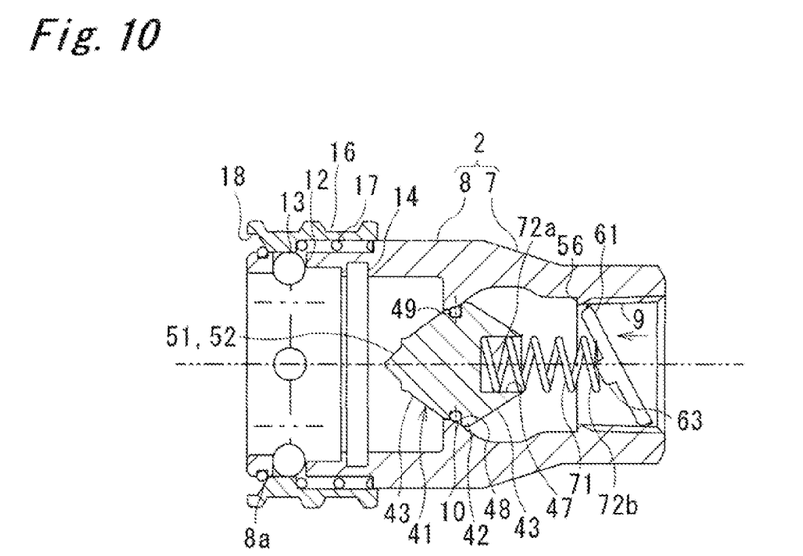
FIG. 10 is a cross-sectional view of an initial stage of assembling a socket of the fluid coupling in FIG. 2.

Procedures of attaching the valves 41, the spring holders 61, and the springs 71 into the insides of the plug 1 and the socket 2 from a state where they are detached are the same, though a description is made of the procedure in the socket 2. In order to assemble the socket 2, first, as shown in FIG. 10, the valve 41 is inserted into the socket 2 from an opening end thereof on a right side in FIG. 10, and the largest diameter portion 42 of the valve 41 is allowed to abut against a valve seat 10 of the socket 2, whereby the valve 41 is mounted on the socket 2. The spring 71 is fitted into the spring mounting hole 47 of the valve 41 from the one terminal end portion 72a. Next, in a state where the spring holder 61 is inclined, the protrusion 63 of the spring holder 61 is fitted to an inner circumferential surface of the terminal end portion 72b located on the other side of the spring 71, and the spring holder 61 is pressed toward the valve 41.

Figure 11:
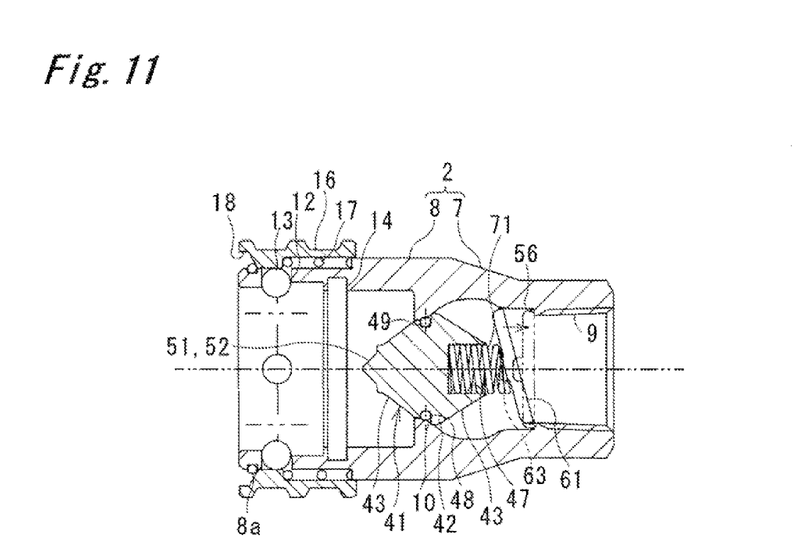
FIG. 11 is a cross-sectional view of a final stage of assembling the socket of the fluid coupling in FIG. 2.

In a state where both end portions of the spring holder 61 pass through the step portion 56 of the socket 2 and the spring holder 61 is located on the valve 41 side relative to the step portion 56, as shown in FIG. 11, one of the end portions is engaged with the step portion 56, and subsequently, the other end portion is engaged with the step portion 56 by the biasing force of the spring 71. At this time, the end portions 68 of raised walls 66 of the spring holder 61 abut against the inner circumferential surface of the socket 2, and accordingly, the spring holder 61 is positioned on the inner circumferential surface of the socket 2, whereby centers of the spring holder 61 and the socket 2 can be prevented from being shifted from each other. Moreover, the edge portion 69 of the base portion 64 is curved along and abuts against the inner circumferential surface of the socket 2, whereby the centers of the spring holder 61 and the socket 2 can be further prevented from being shifted from each other. As described above, the socket 2 can be assembled easily and surely.

The plug 1 is gradually inserted into a plug insertion portion 8 in order to connect the plug 1 and the socket 2, which are assembled as described above, to each other. Then, as shown in FIG. 3, the recessed portion 46 formed on the plug-side abutment portion 44 of the plug-side valve 41 and the protruding portion 52 formed on the socket-side abutment portion 51 of the socket-side valve 41 are engaged with each other. In such a way, the valves 41 are positioned on the center axis, and accordingly, center offset is prevented from occurring, whereby unnecessary resistance increase at the time of fluid passage, which is caused by the center offset, can be prevented.

When the plug 1 is further inserted, the springs 71 are contracted while being brought into slide contact with inner circumferential surfaces of the spring mounting holes 47. Hence, even if the springs 71 are contracted, the valves 41 can be held on the center axis 35.

When the connection between the plug 1 and the socket 2 is completed, as shown in FIG. 4, the springs 71 are housed in insides of the spring mounting holes 47. In such a way, resistances which have occurred heretofore in the springs 17 can be reduced. Moreover, the two valves 41 form a continuous flow path without forming a gap therebetween between the spring holder 61 of the plug 1 and the spring holder 61 of the socket 2, whereby a resistance of the flow path can be reduced and the valves 41 can be stably positioned in the axial direction.

The valves 41 do not cause the center offset in such a manner that the inner circumferential surfaces of the spring mounting holes 47 contact outer circumferences of the springs 71. Accordingly, the valve guides 24 provided heretofore are not necessary. Hence, overall lengths of the valves 41 are shortened, and as shown in FIG. 4, a resistance occurrence section L1 between the spring holder 61 of the socket 2 and the spring holder 61 of the plug 1 is shortened in a state where the plug 1 is connected to the socket 2. Accordingly, the resistance occurring in the flow path can be reduced.

Moreover, the spring holders 61 include the base portions 64 engaged with the step portions 56. Accordingly, lengths of the spring holders 61 in the direction of the center axis 35 are shortened, whereby the resistance occurrence section L1 can be further shortened. Here, for example, a dimension of a resistance occurrence section L11 of the conventional fluid coupling, which is shown in FIG. 16, is 74 mm, whereas the resistance occurrence section L1 of the present invention, which is shown in FIG. 4, is shortened to 47 mm.

The resistance occurrence section L1 is shortened, whereby an overall length L2 of the connected plug 1 and socket 2 can also be shortened. Accordingly, a space of an installation place for the fluid coupling is reduced, and a material for forming the fluid coupling is reduced, whereby resources can be saved. Here, for example, an overall length of the conventional fluid coupling is 105 mm, whereas the overall length L2 of the fluid coupling according to the present invention is shortened to 83 mm.

In a state where the plug 1 and the socket 2 are separated from each other, the socket 2 is often kept mounted on a pipe, while the plug 1 is connected to a hose or the like. Therefore, the plug-side abutment portion 44 located on a tip end of the valve 41 of the plug 1 sometimes collides with another member. In particular, if the tip end of the valve has a protruding shape, the tip end is prone to be scratched. If the tip end of the valve is scratched, when the plug 1 is attached to the socket 2, the fitting between the valves becomes unstable, and a difference in height, a gap or the like occurs therebetween, thereby causing a resistance to the flow of the fluid. Hence, as in the present invention, the plug-side abutment portion 44 is formed in the recessed portion 46, whereby the tip end of the valve can be prevented from being scratched due to such collision with another member. Accordingly, the fitting between the valves can be surely made to prevent the resistance to the flow of the fluid.

Moreover, configurations of the valves 41 and the spring holders 61 are simplified as mentioned above, and accordingly, manufacturing cost of the fluid coupling can be reduced.

The openings 67 are provided in the base portion 64 of each of the spring holders 61, and accordingly, a surface area of the spring holder 62 in a direction of the flow path is small, and the pressure loss caused by the spring holder 61 is reduced, whereby the flow rate of the fluid in the flow path can be increased.

The spring holder 61 includes the rectangular base portion 64 arranged in the direction perpendicular to the flow path in the inside of the plug 1 or the socket 2 and the raised walls 66 raised from the edges of the base portion 64. Accordingly, the strength of the spring holder 61 can be enhanced.

The raised walls 66 of the base portion 64 installed on an upstream side in the inside of the plug 1 are raised toward the downstream direction from the base portion 64. Accordingly, as compared with a case where the raised walls 66 are raised toward the upstream side, the resistance caused by the spring holder 61 on an inlet side of the flow path, where the pressure loss is large, can be reduced. Hence, the pressure resistance in the flow path can be stabilized, and a resistance balance can be ensured.

Figure 12:
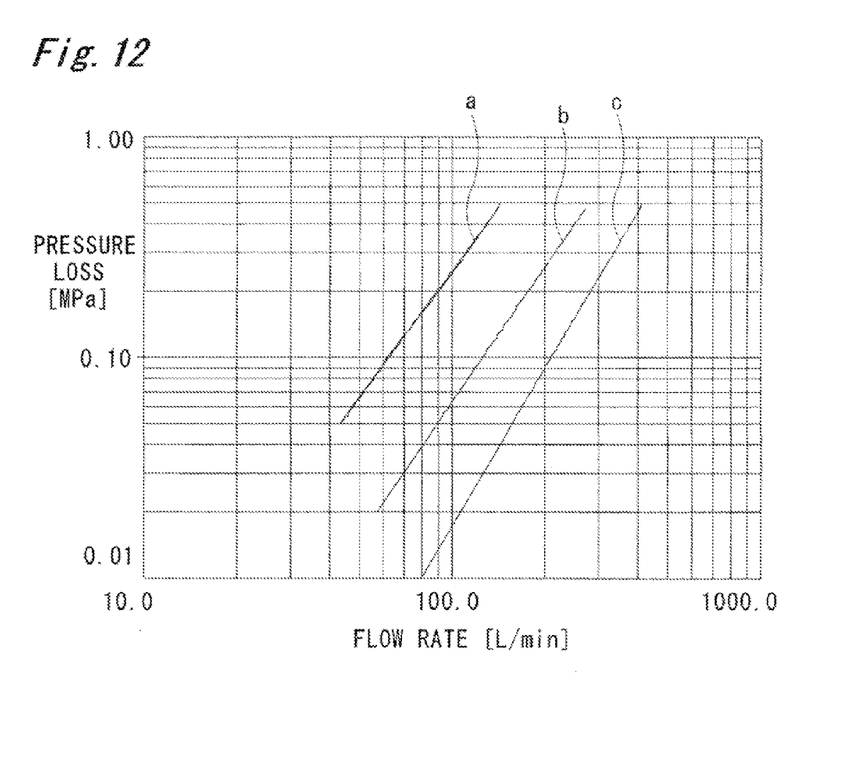
FIG. 12 is a graph showing relationships between flow rates and pressure losses caused thereby in the fluid coupling of the present invention and conventional fluid couplings.

FIG. 12 shows relationships between pressure losses occurring in the conventional fluid coupling (a) described in Japanese Unexamined Patent Publication No. 2002-295770, the conventional fluid coupling (b) shown in FIG. 16, and the fluid coupling (c) according to the present invention, and flow rates of the fluid when the pressure losses occur in the respective fluid couplings. Each of the pressure losses is calculated from pressure values measured on both ends of each of the fluid couplings when the fluid is flown through a circuit having the flow paths formed therein, the flow paths being formed by connecting both the ends of the fluid coupling to pipes.

When the pressure losses at the same flow rate are compared with one another, the pressure losses of the fluid couplings, which occur in a case where the fluid at a flow rate of 100 L/min is flown through the circuits are: approximately 0.24 MPa in the fluid coupling (a); approximately 0.064 MPa in the fluid coupling (b); and approximately 0.017 MPa in the fluid coupling (c) according to the present invention. Hence, if the pressure loss in the fluid coupling of a graph (a) is defined as 100%, the pressure loss in the fluid coupling (b) becomes approximately 27%, and the pressure loss in the fluid coupling (c) according to the present invention becomes approximately 7%. From the above, it is understood that the pressure loss is reduced, thus making it possible to reduce energy required for pressure-feeding the fluid.

Moreover, in a case where an allowable pressure loss is defined to be 0.1 MPa, it is possible to ensure, as flow rates of the fluid that can be flown through the respective fluid couplings: approximately 62 L/min for the fluid coupling (a); approximately 130 L/min for the fluid coupling (b); and approximately 205 L/min for the fluid coupling (c) according to the present invention. Hence, if the flow rate of the fluid that can be flown through the fluid coupling (a) is defined as 100%, the flow rate of the fluid that can be flown through the fluid coupling (c) according to the present invention becomes approximately 330%. As described above, the fluid coupling (c) according to the present invention is extremely useful when the increase of the flow rate is desired in the case where it is difficult to change a pump and pipes, also leading to suppression of unnecessary investment.

The present invention is not limited to the above-described embodiment, and is modifiable in various ways.

Regarding each of the valves 41, in the present embodiment, the largest diameter portion 42 is provided on the center of the valve 41. However, such a place of the largest diameter portion 42 is not limited to the center as long as the valve 41 is configured so as to abut against the valve seat 4 or 10 of the plug 1 or the socket 2. Moreover, the inclined surface 43 is formed of straight lines when viewed from a side in this embodiment, though a similar effect can be obtained even if the inclined surface 43 has curved lines.

In the present embodiment, each of the spring holders 61 includes the rectangular base portion 64, the raised walls 66, and the protrusions 63, though the shape of the spring holder 61 is not particularly limited as long as the valve 41 and the spring 71 are supported and positioned by the spring holder 61.

What is claimed is:
1. A fluid coupling comprising a plug and a socket, the plug and the socket being coupled to each other so as to seal a fluid therebetween, each of the plug and the socket including:
a valve;
a spring that biases the valve so as to bring the valve into pressure contact with a valve seat formed on an inner circumferential surface of the plug or the socket; and
a spring holder that positions and holds the spring, wherein each of the plug and the socket houses the valve, the spring, and the spring holder,
when the plug is inserted into the socket, the valve of the plug and the valve of the socket abut against each other, and are retreated against biasing forces of the springs, and flow paths in the plug and the socket are connected to each other, and wherein
each of the valves includes:
a largest diameter portion that abuts against the inner circumferential surface of the plug or the socket and positions the valve in an axial direction thereof; and
inclined surfaces reduced in diameter into a conic shape with a same angle from the largest diameter portion toward both sides in the axial direction,
wherein each of the spring holders includes:
a base portion engaged with a step portion provided on an inner circumferential surface of the plug or the socket;
raised walls raised from both edges of the base portion; and
protrusions supporting the spring, the protrusions protrude from the raised walls toward the valve concentrically with a center axis of the socket or the plug,
wherein one end of each of the springs is supported on the raised walls of the spring holder, and another end of each of the springs is housed in a spring mounting hole provided in the valve, each of the springs has an outer diameter sufficient for contacting an inside of the spring mounting hole and an inner diameter sufficient for fitting around the protrusions,
wherein a part of the spring is exposed between the spring holder and the valve when the valve of the plug and the valve of the socket are separated and each of the springs is extended, and each of the springs is completely housed in the valve when the valve of the plug and the valve of the socket abut against each other and each of the springs is compressed.

2. The fluid coupling according to claim 1, wherein among end portions of the valve of the plug and the valve of the socket which are opposite to each other, one of the end portions is formed with a recessed portion, and another one of the end portions is formed with a protruding portion, and wherein the recessed portion and the protruding portion engage with each other so that the end surface of the valve of the plug and the end surface of the valve of the socket come into contact with each other.

3. The fluid coupling according to claim 2, wherein the recessed portion is formed on the end portion of the valve of the plug.

4. The fluid coupling according to claim 1, wherein an opening is provided in the base portion of each of the spring holders.

5. The fluid coupling according to claim 1, wherein end portions of the raised walls of each of the spring holders abut against the inner circumferential surface of the plug or the socket.

6. The fluid coupling according to claim 1, wherein edge portions of the base portion of each of the spring holders are curved so as to abut against the inner circumferential surface of the socket or the plug.

7. The fluid coupling according to claim 1, wherein the raised walls of the spring holder installed on an upstream side in the flow path in the plug are raised from the base portion toward a downstream direction in the flow path.

* * * * *